(12) United States Patent
Uskela et al.

(10) Patent No.: US 7,333,499 B1
(45) Date of Patent: Feb. 19, 2008

(54) SATISFYING DATA REQUESTS IN A TELECOMMUNICATIONS SYSTEM

(75) Inventors: Sami Uskela, Espoo (FI); Aapo Rautianen, Espoo (FI); Eva Maria Leppanen, Espoo (FI); Lucia Tudose, Espoo (FI); Mari Nieminen, Espoo (FI)

(73) Assignee: Nokia Corporation, Espoo (FI)

( * ) Notice: Subject to any disclaimer, the term of this patent is extended or adjusted under 35 U.S.C. 154(b) by 952 days.

(21) Appl. No.: 10/070,837

(22) PCT Filed: Sep. 5, 2000

(86) PCT No.: PCT/IB00/01322

§ 371 (c)(1),
(2), (4) Date: Sep. 9, 2002

(87) PCT Pub. No.: WO01/20873

PCT Pub. Date: Mar. 22, 2001

(30) Foreign Application Priority Data

Sep. 13, 1999   (GB) ................... 9921582.2

(51) Int. Cl.
*H04L 12/28*   (2006.01)

(52) U.S. Cl. .............. 370/401; 370/449; 370/355; 370/356

(58) Field of Classification Search ........... 370/338
See application file for complete search history.

(56) References Cited

U.S. PATENT DOCUMENTS 5,809,415 A *  9/1998  Rossmann ............ 455/422.1

5,878,397 A   3/1999  Stille et al. ............... 704/466

FOREIGN PATENT DOCUMENTS

JP   08/307852   11/1996

(Continued)

OTHER PUBLICATIONS

Paul D. Baker et al.. : "Comverse Network Systems Expands Its Intelligent Short Message Service Center's Support For All Types of Digital Wireless Subscribers Easy Access To Wireless Data Services And The Internet" Comverse News and Financial Information. Online!Feb. 8, 1999, pp. 1-2, EP002133580 retrieved from the internet Url: http://www.comverse.com/news/news/news_990208.html on Mar. 17, 2000.

(Continued)

*Primary Examiner*—Duc Ho
(74) *Attorney, Agent, or Firm*—Alston & Bird LLP

(57) ABSTRACT

A telecommunications system for receiving from a telecommunications unit a request for data from a target network address may include a request completion unit configured to receive the request for data from the telecommunications unit and to transmit a request for the data to the target address. The request completion unit may be further configured, on receiving the data from the target address, to transmit the data to the telecommunications unit via the radio link. The request completion unit, if it is determined that the request to the target address is not satisfied, may be configured to attempt to establish communication with the target address, and, if it is determined that such communication is possible, transmit an indication via the radio link to the telecommunications unit.

25 Claims, 2 Drawing Sheets

FOREIGN PATENT DOCUMENTS

| | | |
|---|---|---|
| JP | 08-307852 A | 11/1996 |
| JP | 09-018056 A | 1/1997 |
| JP | 09/18956 | 1/1997 |
| JP | 10/312351 | 11/1998 |
| JP | 10-312351 A | 11/1998 |
| WO | WO 97/41654 | 11/1997 |
| WO | WO 98/58476 | 12/1998 |

OTHER PUBLICATIONS

Sami Hanhikoski et al.,: "SMS—Short 1-16 Message Service", Johdatus Tietokoneverkkoihin Harjoitustyö, Apr. 27, 1998, p. 1-4, XP002133581.

Michel Mouly et al.,: "GSM—The System for Mobile Communications", 1992, Cell & Sys. Correspondence, Mercer Island, WA, U.S.A. XP002133582 235920, p. 272, paragraph 5.2.3. -p. 277, paragraph 5.2.4., p. 560 paragraph 8.3.3.—p. 566 paragraph 9.

* cited by examiner

SATISFYING DATA REQUESTS IN A TELECOMMUNICATIONS SYSTEM

PRIORITY CLAIM

This is a national stage of PCT application No. PCT/IB00/01322, filed on Sep. 5, 2000. Priority is claimed on that application, and on patent application No. 9921583.2 filed in Great Britain on Sep. 13, 1999.

FIELD OF THE INVENTION

This invention relates to a telecommunications system having means for attempting to satisfy requests for data. The telecommunications system could, for example, be a cellular telephone system.

BACKGROUND OF THE INVENTION

FIG. 1 is a simplified-schematic diagram of a cellular telephone system. A cellular telephone 1 can communicate by radio with a base station 2 of a cellular network indicated at 3. The cellular network is connected to other telecommunications networks such as a circuit switched public telephone network 4 and a packet switched network such as the internet 5. By means of the radio connection to the cellular network, and the routing and control equipment in the cellular network 3, the cellular telephone can communicate with other telecommunications units such as another cellular telephone 10, a land-line telephone 11 or a terminal 12 connected to the internet. The terminal 12 could communicate with the cellular telephone 1 for any available packet data service such as e-mail or supply of world-wide web (WWW) pages.

In a number of packet-based services, of which WWW is one example, data held on one terminal (the target terminal) is requested by another terminal. If the target terminal is able to meet the request then it transmits the data towards the requesting terminal and the data can then be routed to the requesting terminal by the intermediate network. It may happen that due to the state of the network or the target terminal the request for data cannot be satisfied. This may, for example, occur if the network is unable to route the request to the target terminal—due to a fault or a traffic overload—or if the target terminal itself is unavailable or too busy to deal with the request. In these circumstances the request might not be satisfied. For instance, a terminal such as cellular telephone 1 may request a WWW page from WWW server 13 connected to the internet. If the server 13 is busy then the request might not be satisfied, and the requested WWW page might not be supplied to the requesting terminal 1. In such a situation, where the requesting terminal's request is not satisfied, the requesting terminal may transmit another request for the data. Such re-requesting may be provided as a feature of data software such as a web-browser operating on the terminal 1, in a similar manner to such features on personal computers with wire-line links to the internet.

The inventors of the present invention have recognised that the approach described above for re-requesting data can have several disadvantages in a system in which the requesting terminal is connected by radio to the network via which the data is to be provided. First, in such an environment the radio message carrying the repeated request from the requesting terminal generates additional radio traffic which may cause additional radio interference with other users—especially in a system such as the proposed W-CDMA system in which more than one local user can transmit on the same radio frequency at the same time. Second, there may be a considerable delay before the target terminal is available to provide the data and several re-requests may be needed before the data is provided. In the approach described above the requesting terminal remains connected by radio so as to make those requests—this again increases network traffic, and may also mean that the user's phone bill is increased.

SUMMARY OF THE INVENTION

According to one aspect of the present invention there is provided a telecommunications system for receiving from a telecommunications unit a request for data from a target network address, the system comprising: request means for receiving the first request and transmitting a request for the data to the target address; and response means for, on receiving the data from the target address, transmitting the data to the telecommunications unit; and wherein the request means comprises completion means for, if it is determined that the request to the target address is not satisfied: attempting to establish communication with the target address, and if it is determined that such communication is possible transmitting an indication to the telecommunications unit.

The system could be arranged so that the request completion means is not automatically activated when a request is made by the telecommunications unit. The request completion means could be activated only if the request is not satisfied. If a request is not satisfied the telecommunications unit could inquire of its user (for example in response to a message from the telecommunications system) whether the request completion means is to be activated.

The telecommunications system could comprises buffer for storing the said data until the telecommunications unit is available to receive it.

According to a second aspect of the present invention there is provided a method for operating a radio telecommunications network, comprising the steps of: receiving by radio from a telecommunications unit a request for data from a target network address; transmitting a request for the data to the target address; on receiving the data from the target address, transmitting the data to the telecommunications unit; and if it is determined that the request to the target address is not satisfied: attempting to establish communication with the target address, and if it is determined that such communication is possible transmitting an indication to the telecommunications unit.

The transmitting of the said request to the target address may involve a message generated by the telecommunications unit being forwarded to the target address or may involve another message generated by the system being forwarded to the target address.

The said attempting to establish communication with the target address may involve polling the target address to determine whether it is capable of data communication to meet the request or may involve repeating the request.

The said indication may be an indication that the target address (or a terminal at that address) is capable of data communication, or may be an indication comprising the requested data or substitute data. If the requested data is to be transmitted to the telecommunications unit, especially if it is to be transmitted after an attempt to establish communication as mentioned above, then it may be pushed by the system to the telecommunications unit, for example by means of the "push" facility of the wireless application protocol (WAP).

The request could be queued at a terminal or associated equipment at the target address. The data could then be provided by when its turn arises in the corresponding queue.

Suitably the said attempting to establish communication comprises repeating the transmission of the request to the target address. The said determination that such communication is possible may be made on receipt of the said data from the target address and the said transmitting of an indication comprises transmitting the data to the telecommunications unit. Alternatively, or in addition, the said attempting to establish communication may comprises polling the target address to determine whether communication can be made with the target address.

Preferably an internet protocol link can be supported between the telecommunications unit and the target address. A terminal addressable by means of the target address is preferably adapted for packet data communication by means of the target address. Such a terminal may be a world-wide web server or other data server. Such a terminal may comprise a store capable of storing data for transmission over a packet link. Preferably an internet protocol link adapted for use over a radio link can be supported between the telecommunications system and the telecommunications unit.

The telecommunications unit is suitably capable of communicating by radio with the telecommunications system. The telecommunications unit may be a mobile telephone.

The telecommunications system is preferably a cellular telecommunications system.

The said data preferably comprises hypertext transfer protocol data.

The said target address is preferably a universal resource locator address.

The completion means is preferably capable of re-establishing a connection with the telecommunications unit in order for the said indication to be carried to the telecommunications unit.

In each aspect of the invention the mobile unit may, for example, be a radio telephone.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The present invention will now be described by way of example with reference to the accompanying drawings, in which.

DETAILED DESCRIPTION OF THE PRESENTLY PREFERRED EMBODIMENTS

Figure 1:
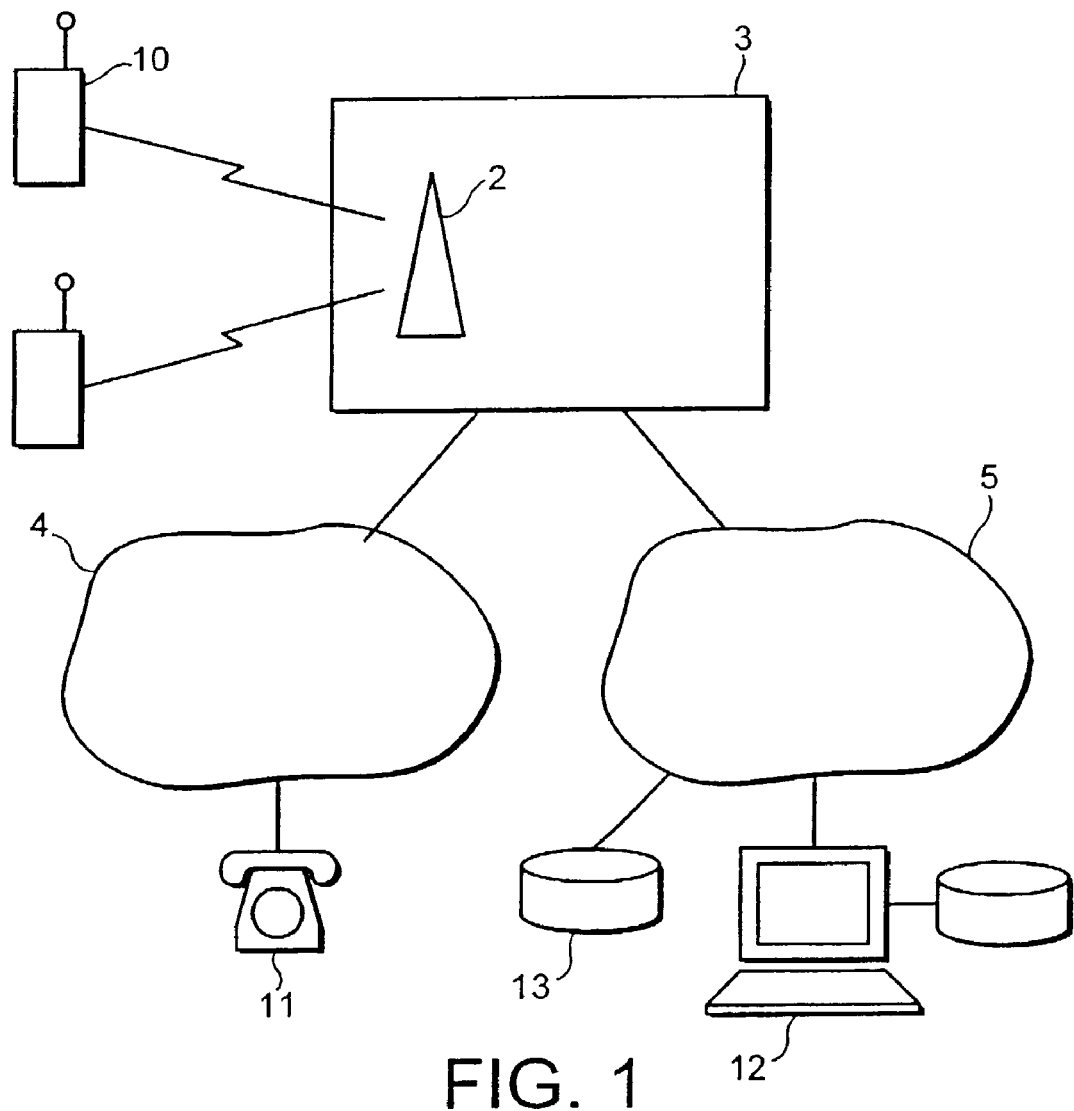
FIG. 1 illustrates a cellular telephone system.
Figure 2:
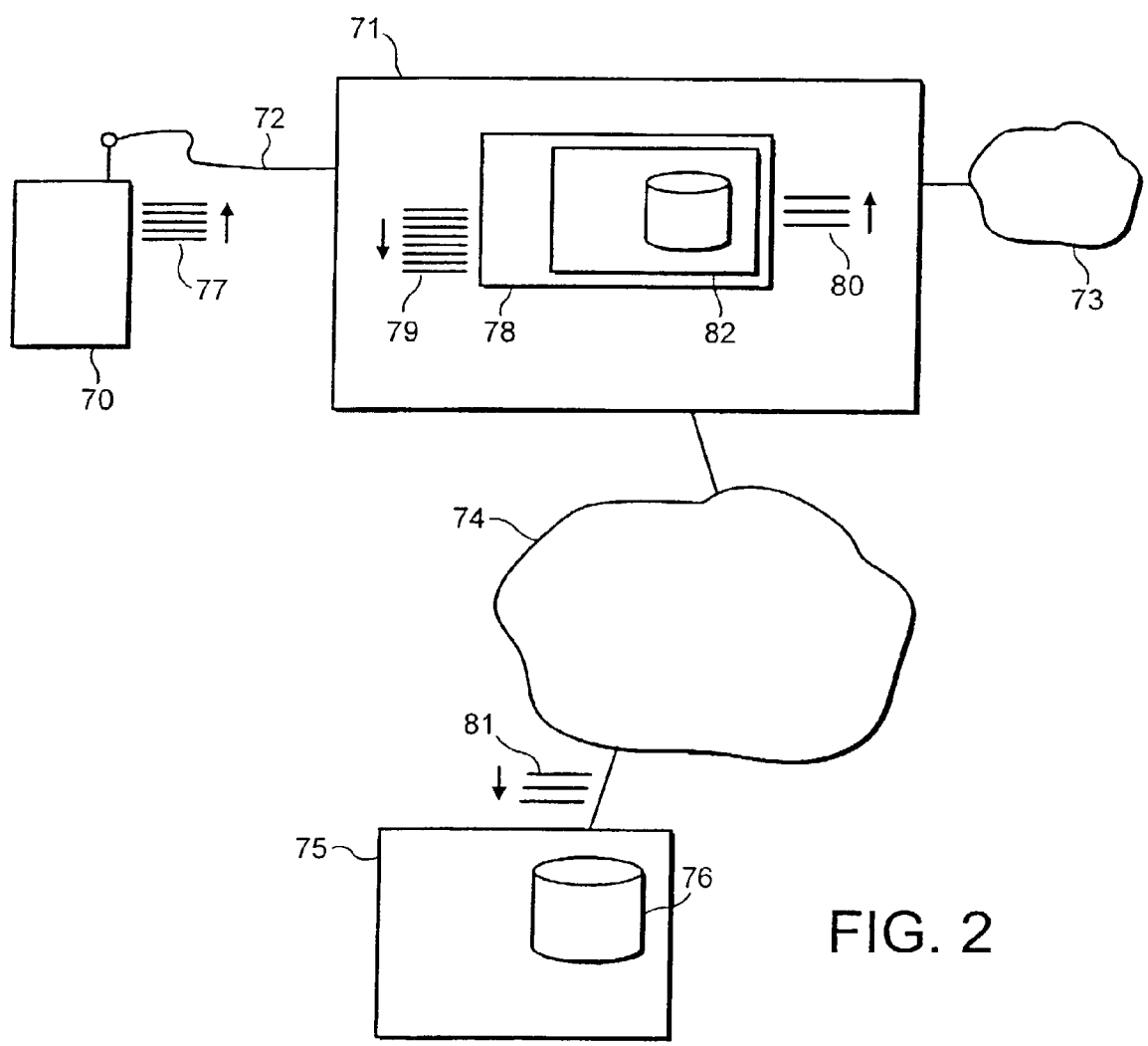
FIG. 2 illustrates the architecture of a specific aspect of a cellular telephone system.

FIG. 2 illustrates a mobile station 70 in connection with a cellular telephone network 71 via a radio link 72. The cellular telephone network is connected to other networks 73, 74. In this example, network 73 is a circuit switched (CS) network such as a public switched telephone network (PSTN), and network 74 is a packet switched (PS) network such as the internet. The cellular telephone network 71 may be capable of providing the mobile station with a connection to a terminal in the CS network or the PS network so that the mobile station can exchange CS data (such as conventional voice traffic) or PS data (such as data packets) with the terminal.

A terminal 75 is connected to the packet switched network 74. The terminal 75 is accessible by means of its address in the network, which may suitably be an IP address or URL. The terminal 75 suitably includes a storage means 76 such as a hard disc or other electronic storage medium that stores data. The terminal 75 may be configured to transmit data from the storage means to another location in response to a request for that data. One example of such a system is for the terminal 75 to represent a world-wide web (WWW) server and for the storage means 76 to store web pages. Then requests for web pages that are addressed to the server 75 and that specify the address of an originating terminal may be routed to the server 75 by the network 74. On receiving a request the server generates a response message that is addressed to the originating terminal and that contains the requested page and transmits that message towards the originating terminal over the network 74. The response message is directed by the network 74 to the originating terminal which then decodes the message and displays or otherwise processes the page data.

The mobile station 70 may be capable of supporting a PS network protocol stack such as TCP/IP (transmission control protocol/internet protocol) by means of which it may be able to establish a connection via the cellular telephone network 71 to the PS network 74, and communicate with the web server 75. The protocol stack supported by the mobile station may be a conventional protocol stack such as standard TCP/IP or may be a protocol stack that is enhanced for use over radio links such as link 72 by tolerating higher error rates and/or longer gaps in communications than are normally tolerated for fixed data links. In the latter case, which is illustrated in FIG. 2, the enhanced stack is used at the mobile station (at 77) and runs to a gateway unit 78 in the cellular network which operates the enhanced stack (at 79) for its communications with the mobile station and a conventional stack (at 80) for its communications with the PS network 74. A communicating unit connected to the PS network (such as server 75) correspondingly uses the conventional stack (at 81).

Instead of TCP/IP other suitable network protocols or protocol stacks could be used.

The mobile station 70 may make a request for data to a unit such as server 75 in the PS network. If the server 75 or a link to it is busy then the request may be rejected or not answered, and the data will not be supplied to the mobile station 70. As explained above, it would be desirable for there to be a means for such a request to be satisfied.

Cellular network 71 includes a request completion unit 82. The request completion unit 82 is illustrated as a distinct unit in FIG. 2 but it could in practice be integrated with another network unit and/or provided by means of suitable software rather than dedicated hardware. The purpose of the request completion unit is to attempt completion of unanswered requests for packet data by the mobile station 70. If the mobile station 70 requests data (e.g. a web page) from an object terminal (e.g. server 76) that cannot satisfy the request, for example because it is down (inoperative), busy or unreachable the request completion unit repeats the request automatically. It is hoped that the requested data will be provided in response to that request, whereupon that data can be forwarded to the mobile station 70 so as to meet its request for the data. If the data is still not provided the request completion unit may repeat the request again.

The request completion unit may determine that a request has not been satisfied by means of one or both of:
i. no response to a request having been received after a preset time period;
ii. a message having been received indicating that the request cannot be satisfied (for example, indicating that the object terminal is busy or unreachable);

or by another means such as by the receipt of an appropriate error message.

In order for the request completion unit to perform its function it should be aware of request messages from the mobile station 70 and responses to those messages, and/or of return messages indicating that requests from the mobile station cannot be satisfied. For the first of those cases the network 71 is preferably configured so that when the mobile station 70 issues a request for packet data (for example a request for a web page), that request is transmitted to the request completion unit 82. The request completion unit 82 may then either:
i. generates a corresponding request (for the same data and from the same source as are specified in the request from the mobile station) and transmits that request to the PS network 75; or
ii. forwards the request directly on to the PS network 75 having logged it.

Then, if the request is satisfied by a response from the object terminal in network 75 (for example server 76) the resulting data is forwarded, possibly via completion unit 82, to the mobile station. But if the request is not satisfied after a preset period or if a return message indicating an error or unreachable condition is received then the completion unit may take action to repeat the request. The request completion unit includes a store for storing data on outstanding requests.

Instead of repeating the request the request completion unit could poll the address to which the request was directed to determine when the unit at that address was again accessible, and then notify the mobile station 70, which generated the request, that the unit was accessible. The mobile station 70 could then repeat the request itself if necessary.

The user could be given an altering message, for example as a visual message, a beep or a ringing tone, when the data has been or can be received by the terminal. The terminal could be capable of displaying a list of addresses from which data had been unsuccessfully requested but which are now available for providing data.

The system described above has significant advantages over other approaches, such as relying on the mobile station 70 to repeat requests for the wanted data. If the mobile station 70 repeats requests for the wanted data, that involves increased traffic over the air interface to the cellular network 70. That causes increased signalling load in the network and, in a system in which radio communication by the mobile station 70 may interfere with transmissions of other mobile stations (as in the proposed wideband code division multiple access (W-CDMA) system) increased inter-user interference.

The request completion unit may provide additional functionality, especially in a system that included the general packet radio service (GPRS) or the like. For instance, if there is a delay before the requested data can be provided or before the request completion unit is able to indicate that the object terminal is able to accept requests, the user terminal 70 may have dropped its traffic connection with the network 71. In that case the request completion unit may be able to re-establish that connection, for example by means of a mobile terminated PDP context activation procedure.

It will be appreciated that the cellular network could be operable according to any suitable protocol, for example the GSM (Global System for Mobile Communications) system, the proposed W-CDMA system or derivatives thereof.

The mobile station could be a mobile telephone—which could be provided with software to support web browsing or the like, or could be connected to a personal computer to provide that device with radio network connectivity. In particular, the mobile telephone could have mobile data communicator functionality.

The present invention may include any feature or combination of features disclosed herein either implicitly or explicitly or any generalisation thereof, irrespective of whether it relates to the presently claimed invention. In view of the foregoing description it will be evident to a person skilled in the art that various modifications may be made within the scope of the invention.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A telecommunications system for receiving from a telecommunications unit via a radio link a request for data from a target network address, the system comprising:
   a request completion unit configured to receive the request for data from the telecommunications unit and to transmit a request for the data to the target address, and further configured, on receiving the data from the target address, to transmit the data to the telecommunications unit via said radio link;
   and wherein the request completion unit, if it is determined that the request to the target address is not satisfied, is configured to:
   i. attempt to establish communication with the target address, and
   ii. if it is determined that such communication is possible transmit an indication via said radio link to the telecommunications unit.

2. A telecommunications system as claimed in claim 1, wherein said request completion unit is configured to attempt to establish communication by repeating the transmission of the request to the target address.

3. A telecommunications system as claimed in claim 2, wherein said request completion unit is configured such that determination that such communication is possible is made on receipt of the said data from the target address and transmitting the data to the telecommunications unit as said indication.

4. A telecommunications system as claimed in claim 1, wherein said request completion unit is configured such that attempting to establish communication comprises polling the target address to determine whether communication can be made with the target address.

5. A telecommunications system as claimed in claim 1, wherein an internet protocol link can be supported between the telecommunications unit and the target address.

6. A telecommunications system as claimed in claim 5, wherein an internet protocol link adapted for use over a radio link can be supported between the telecommunications system and the telecommunications unit.

7. A telecommunications system as claimed in claim 1, wherein the telecommunications unit is a mobile telephone.

8. A telecommunications system as claimed in claim 1, wherein the telecommunications unit is a cellular telecommunications system.

9. A telecommunications system as claimed in claim 1, wherein the data comprises hypertext transfer protocol data.

10. A telecommunications system as claimed in claim 1, wherein the target address is a universal resource locator address.

11. A telecommunications system as claimed in claim 1, wherein the request completion unit is configured to re-establish a connection with the telecommunications unit in order for the said indication to be carried to the telecommunications unit.

12. A telecommunications system as claimed in claim 1, wherein the said indication is sent by means of a data push facility.

13. A telecommunications system as claimed in claim 1, wherein the telecommunications unit is capable of alerting a user of the telecommunications unit that the said data is available.

14. A method for operating a radio telecommunications network, comprising:
  receiving by radio from a telecommunications unit a request for data from a target network address at a unit intermediate said telecommunications unit and said target address;
  transmitting a request for the data to the target address;
  on receiving the data from the target address, transmitting the data to the telecommunications unit; and
  at said intermediate unit, if it is determined that the request to the target address is not satisfied:
    i. attempting to establish communication with the target address, and
    ii. if it is determined that such communication is possible transmitting an indication to the telecommunications unit.

15. A request completion unit comprising:
  a receiver configured to receive a request for data from a target network address, said request being received from a telecommunications unit via a radio link;
  a transmitter configured, on receiving the data from the target address to transmit the data to the telecommunications unit via said radio link; and
  a processor configured to:
    i. attempt to establish communication with the target address, and
    ii. if it is determined that such communication is possible to cause the transmitter to transmit an indication via said radio link to the telecommunications unit.

16. A unit as claimed in claim 15, wherein an internet protocol link can be supported between the telecommunications unit and the target address.

17. A unit as claimed in claim 15, wherein the data comprises hypertext transfer protocol data.

18. A unit as claimed in claim 15, wherein the target address is a universal resource locator address.

19. A unit as claimed in claim 15, wherein the processor is configured to cause re-establishing of a connection with the telecommunications unit in order for the said indication to be carried to the telecommunications unit.

20. A unit as claimed in claim 15, wherein the said indication is sent by means of a data push facility.

21. A request completion unit as claimed in claim 15, said unit being incorporated in a network unit.

22. A request completion unit comprising:
  receiving means for receiving a request for data from a target network address, said request being received from a telecommunications unit via a radio link;
  transmitting means for, on receiving the data from the target address, transmitting the data to the telecommunications unit via said radio link; and
  processing means for, if it is determined that the request to the target address is not satisfied,
    i. attempting to establish communication with the target address; and
    ii. if it is determined that the communication as possible causing said transmitting means to transmit an indication via the radio link to the telecommunications unit.

23. A telecommunications system comprising:
  a telecommunications unit configured to send a request for data from a target network address, via a radio link; and
  a request completion unit comprising:
  a receiver configured to receive said request via said radio link;
    a transmitter configured, on receiving the data from the target address to transmit the data to the telecommunications unit via said radio link; and
    a processor configured, if it is determined that the request to the target address is not satisfied, to:
      i. attempt to establish communication with the target address, and
      ii. if it is determined that such communication is possible cause said transmitter to transmit an indication via said radio link to said telecommunications unit.

24. A telecommunications system comprising:
  request means for receiving, via a radio link, a request for data from a target network address, said request being received from a telecommunications unit and for transmitting a request for the data to the target address; and
  response means for, on receiving the data from the target address, transmitting the data to the telecommunications unit via said radio link and wherein the request means comprises completion means for if it is determined that the request to the target address is not satisfied,
    i. attempting to establish communication with the target address, and
    ii. if it is determined that such communication is possible transmitting an indication via said radio link to said telecommunications unit.

25. A computer readable medium having computer executable components encoded therein comprising:
  a first computer executable component configured to cause a request completion unit to receive via a radio link from a telecommunications unit a request for data from a target network address;

a second computer executable component configured when loaded in said request completion unit to transmit a request for data to the target address; and a third computer executable component configured, on receiving the data from the target address to cause the data to be transmitted to the telecommunications unit, and if it is determined that the request to the target address is not satisfied to i. attempt to establish communication with the target address, and ii. if it is determined that such communication is possible transmit an indication via said radio link to said telecommunications unit.

\* \* \* \* \*

UNITED STATES PATENT AND TRADEMARK OFFICE
CERTIFICATE OF CORRECTION

| | | |
|---|---|---|
| PATENT NO. | : 7,333,499 B1 | Page 1 of 1 |
| APPLICATION NO. | : 10/070837 | |
| DATED | : February 19, 2008 | |
| INVENTOR(S) | : Uskela et al. | |

It is certified that error appears in the above-identified patent and that said Letters Patent is hereby corrected as shown below:

<u>Title page,</u>

Item (30), Foreign Application Priority Data, "9921582.2" should read --9921583.2--.

Signed and Sealed this

Fifteenth Day of July, 2008

JON W. DUDAS
*Director of the United States Patent and Trademark Office*